(12) United States Patent
Raudales

(10) Patent No.: US 6,922,908 B1
(45) Date of Patent: Aug. 2, 2005

(54) VEGETABLE PRODUCT DRYING

(76) Inventor: Raul Raudales, 669 Stevens St., Lowell, MA (US) 01851-4519

( * ) Notice: Subject to any disclaimer, the term of this patent is extended or adjusted under 35 U.S.C. 154(b) by 0 days.

(21) Appl. No.: 09/293,198

(22) Filed: Apr. 16, 1999

(51) Int. Cl.[7] ............... F26B 19/00; F26B 11/18; F26B 25/18; F24J 2/04; A47J 31/00
(52) U.S. Cl. ............... 34/93; 34/61; 34/68; 34/86; 34/195; 34/233; 126/634; 126/714; 99/286
(58) Field of Search ............... 34/60, 61, 68, 34/86, 92, 93, 192, 195, 219, 218, 233, 294, 34/197, 196, 201, 204; 126/634, 637, 646, 126/714; 99/279, 286, 447, 448, 450, 467, 99/473–479; 435/426, 466, 467, 494

(56) References Cited

U.S. PATENT DOCUMENTS

| | | | | |
|---|---|---|---|---|
| 1,562,790 A | * | 11/1925 | Rockburg | 34/176 |
| 3,566,770 A | * | 3/1971 | Crossley | 99/289 R |
| 4,006,260 A | * | 2/1977 | Webb et al. | 426/438 |
| 4,099,338 A | * | 7/1978 | Mullin et al. | 34/35 |
| 4,137,898 A | * | 2/1979 | Koizumi et al. | 126/591 |
| 4,221,059 A | * | 9/1980 | Everitt | 126/680 |
| 4,240,210 A | * | 12/1980 | Huang | 34/520 |
| 4,245,398 A | * | 1/1981 | Poisson | 34/93 |
| 4,270,521 A | * | 6/1981 | Brekke | 126/433 |
| 4,290,779 A | * | 9/1981 | Qader | 422/186 |
| 4,369,585 A | * | 1/1983 | Berkoff et al. | 34/63 |
| 4,490,926 A | * | 1/1985 | Stokes | 34/76 |
| 4,996,780 A | * | 3/1991 | Soul-Sun Goe | 34/323 |
| 5,035,117 A | * | 7/1991 | Drake | 62/79 |
| 5,065,528 A | * | 11/1991 | Kaneko et al. | 34/93 |
| 5,193,444 A | * | 3/1993 | Bar-Sheshet | 99/427 |
| 5,584,127 A | * | 12/1996 | Sutherland | 34/93 |
| 5,632,098 A | * | 5/1997 | Finch | 34/63 |
| 5,849,107 A | * | 12/1998 | Itoyama et al. | 136/248 |
| 5,960,560 A | * | 10/1999 | Stoll | 34/529 |
| 6,036,988 A | * | 3/2000 | Lemme et al. | 426/466 |
| 6,065,223 A | * | 5/2000 | Gode | 34/168 |
| 6,202,321 B1 | * | 3/2001 | Soucy | 126/629 |
| 6,438,862 B1 | * | 8/2002 | Soucy | 34/135 |

FOREIGN PATENT DOCUMENTS

| | | | | |
|---|---|---|---|---|
| DE | | 4314645 A1 | * 11/1994 | 34/61 |

(Continued)

OTHER PUBLICATIONS

SUN Utility Network, Inc. "Solar-Dried Coffee Technology." http://www.sunutility.com/soldrdrytek.htm.*

(Continued)

*Primary Examiner*—Henry Bennett
*Assistant Examiner*—Andrea M. Ragonese
(74) *Attorney, Agent, or Firm*—Fish & Richardson P.C.

(57) ABSTRACT

A dryer is constructed and arranged to dry vegetable product, such as coffee beans. The dryer includes a thermal collector that is constructed and arranged to convert solar energy to heat energy, a heat transfer system, and a housing that defines a drying chamber. The thermal collector is positioned toward a light source and is thermally connected to the heat transfer system. The heat transfer system is also in thermal communication with the drying chamber. Therefore heat is able to move from the thermal collector to the drying chamber. Convective forces, or flow, can be used to move air inside the drying chamber, but photovoltaic energy could also be used to enhance this effect.

19 Claims, 12 Drawing Sheets

FOREIGN PATENT DOCUMENTS

| | | | | | |
|---|---|---|---|---|---|
| SU | 1276-886 A | * | 12/1986 | .................... | 34/93 |
| SU | 1653-695 A | * | 6/1991 | .................... | 34/93 |

OTHER PUBLICATIONS

SUN Utility Network, Inc. "Solar Coffee: Help Save the Rainforest, a Cup of Coffee at a Time!" http://www.sunutility.com/coffee.htm.*

Wright, Gregory. "The Solar-Coffee Connection." May 2000. http://www.sustainablebusiness.com/html/insider/may00/solar.cfm.*

RainforestCoffee.com, Inc. "Join the Solar Coffee Revolution: Help Save the Rainforest." 2000. http://www.RainForestCoffee.com/Solar%20Coffee%20Revolution.htm.*

Wright, Gregory. "The Solar-Coffee Connection." Solar Today. Mar./Apr. 2000. http://www.solartoday.org/2000/march-Apr/feature2.html.*

New Ventures Environment Enterprises. "The First Annual Environmental Investor Forum and 100K Environmental Business Plan Competition in Latin America." Summer 1999. http://www.igc.org/wri/meb/envlink/summer99/nvforum.html.*

New Ventures Environment Enterprises. "EEc Launches the First Cycle of Mentoring Services." Winter 2000. http://www.igc.org/wri/meb/envlink/winter00/menteng.html.*

Smith, Cameron. "How To Get Good 'Green' Coffee Beans." May 27, 2000. The Toronto Star. http://www.merchantsofgreencoffee.com/MGCarticle2.pdf.*

Mesoamerican Development Institute Corp. "Solar Coffee Drying." 1997. University of Massachusetts Lowell website. http://energy.caeds.eng.uml.edu/coffee.html.*

Wright, Gregory. "The Solar-Coffee Connection." Mar./Apr. 2000. Solar Today. http://www.ases.org/2000/march-Apr/feature2.html.*

Publication #1 (Highlighted Color Copy): "Solar/Biomass Coffee Drying Systems", Mesoamerican Development Institute Corp. Presentation—Special Coffee Association. Mar. 1997.*

Publication #2 (Highlighted Color Copy): "Cafe Solar", Mesoamerican Development Institute Corp. Presentation—Special Coffee Association. Mar. 1997.*

Nice, Karim. "How Stirling Engines Work." Accessed Aug. 28, 2003. Howstuffworks, Inc. http://howstuffworks.lycoszone.com/stirling-engine.htm/printable.*

C. Ratti, A.S. Mujumdar, "Solar Drying of Foods: Modeling and Numerical Simulation", Solar Energy, vol. 60, Nos. 3/4, pp. 151-157, 1997.

Solar Heated Dehydrator for Fruits and Vegetables Construction Manual, Solarwall, 1994.

B. Perers, "Dynamic Method for Solar Collector Array Testing and Evaluation with Standard Database and Simulation Programs", Solar Energy, vol. 50, No. 6 pp 517-526, 1993.

S. Sokhansanj, D. Bruce, "A Conduction Model to Predict Grain Temperatures in Grain Drying Simulation", American Society of Agricultural Engineers. vol. 30(4), Jul.-Aug. 1987.

R. Bertin, M. Blazques, "Modeling and Optimization of A Dryer", Drying Technology, 4(1), 45-66 (1986).

T.L. Thompson, R.M. Peart, G.H. Foster, "Mathematical Simulation of Corn Drying—A New Model", Transactions of the ASAE, 1968.

"Solar/Biomass Cofffee Drying Systems", Mesoamerican Development Institute Corp. Presentation—Special Coffee Association. Mar. 1997.

"Cafe Solar", Mesoamerican Development Institute Corp. Presentation—Special Coffee Association. Mar. 1997.

* cited by examiner

VEGETABLE PRODUCT DRYING

This invention relates to drying harvested vegetable product, particularly coffee, using solar energy.

Coffee beans must be dried soon after harvest to prevent fermentation or other spoilage. Coffee beans are dried while still green and prior to subsequent processing, such as milling, sorting, or roasting. Typically, large commercial dryers, which burn wood or diesel fuel, dry the beans at a temperature of approximately 70° C. Some commercial dryers are large towers having conveyor belts that continually circulate coffee beans to the top of the tower at which point the coffee beans drop down and bounce over a series of baffles that slow the decent of the coffee beans. Other commercial dryers are large rotating drums wherein heated air is infused through a longitudinal duct through the center of the drum. The heated air is diffused through a set of smaller tubes connected to the duct and extending into the drum where the coffee beans are dried.

The wood and diesel dryers can have adverse environmental impacts. For example, an estimated 16,086 acres of forest are cut annually in Central America to provide energy for drying the coffee harvest. The Energy Department of the Honduran Ministry of Planning estimates that 16% of the industrial consumption of wood in Honduras is devoted to coffee drying. In addition, the burning of wood and diesel fuel can adversely affect air quality.

Furthermore, farmers can not realize the value the drying process adds in the production of coffee. Typically, 80% of coffee traded in the world market comes from small and medium sized farms. However, independent farmers often do not have their own drying facilities. Therefore, the farmers must sell the harvest quickly to a processor or exporter to prevent spoilage of the harvested coffee. The farmers are unable to benefit from the price difference between dry and wet coffee beans, which can be significant. In a weak coffee market, the farmers are unable to postpone the sale of the harvested beans until prices increase.

One aspect of the invention is a dryer for vegetable product, such as coffee beans. The dryer includes a thermal collector that converts solar energy to heat energy, a heat transfer system, and a housing that includes a drying chamber. The heat transfer system is in thermal communication with both the thermal collector and the drying chamber such that heat moves from the thermal collector to the drying chamber.

Preferred embodiments of this aspect of the invention may include the following features.

A photovoltaic module provides electrical power to operate the heat transfer system. The photovoltaic module includes a photovoltaic cell to convert solar energy to electrical energy and a battery to store the electrical energy. Other electronic devices control and/or utilize the electrical energy. The photovoltaic module provides all of the electrical energy consumed by the dryer when solar radiation incident upon the thermal collector is sufficient, e.g., a day of partial to full sun exposure.

The heat transfer system includes two heat transfer circuits each having a pump, a heat transfer medium, and a heat exchanger. In one heat transfer circuit, the heat transfer medium is water, and, in the other heat transfer circuit, the heat transfer medium is air. The heat exchanger is in thermal communication with the thermal collector via one of the heat transfer circuits, and is in thermal communication with the drying chamber via the other heat transfer circuit. Therefore, heat is able to move between the heat transfer circuits.

The heat transfer system also has an additional heat exchanger, a furnace that provides an auxiliary heat source by burning coffee parchment, and a heat storage medium. All of which are in thermal communication with the drying chamber.

The drying chamber includes a heat exhaust port and a moisture exhaust port, and a single port, e.g., an open back side of the housing, can simultaneously serve as both the heat exhaust port and the moisture exhaust port. The drying chamber is in fluid communication with an intake, and the intake is in fluid communication with a pump.

Another aspect of the invention is a method for drying vegetable product in a dryer. The method includes placing the vegetable product in a drying chamber, collecting solar energy, transforming the solar energy into heat energy, transferring the heat energy into the drying chamber, and exhausting moisture from the drying chamber.

Preferred embodiments of this aspect of the invention may include the following steps.

The drying chamber is heated to a temperature sufficiently high to accelerate evaporation of water from coffee beans and sufficiently low to avoid adversely affecting the quality of the coffee beans. The coffee beans are harvested and transported to a dryer located at or near a location of harvest. Coffee parchment can be burned within a furnace to produce additional heat energy that is transferred from the furnace to the drying chamber, e.g, through the heat transfer system. A portion of the heat energy is stored and, subsequently, transferred to the drying chamber. Solar energy is transformed into electrical energy, which is used to transfer the heat energy into the drying chamber.

All the electrical energy and all the heat energy consumed by the dryer are produced by collecting light from the sun and burning coffee parchment. In some embodiments, the availability of such energy is also dependent on the geographic location and the weather conditions, which dictate the amount of solar energy available. In other embodiments, additional devices are added, e.g., a Stirling engine, that allow the system to produce sufficient energy regardless of the geographic location or the weather conditions.

Dry coffee beans are removed from the dryer while wet coffee beans are dried, and additional wet coffee beans are added to the dryer to replace the dry coffee beans. The wet coffee beans are rotated into the space vacated by the dry coffee beans, and the additional wet coffee beans are rotated into the space vacated by the wet coffee beans.

In still another aspect of the invention, a dryer for drying vegetable product, such as coffee beans, includes a housing having a drying chamber. The housing has a cylindrical wall extending around the drying chamber and has opposing end walls at either end of the drying chamber. The housing is perforated so that the drying chamber can intake and exhaust fluid. An infuser is adjacent to the perforations to infuse the fluid through the perforations. The housing rotates relative to the infuser during operation of the dryer.

Preferred embodiments of this aspect of the invention include a heat source to heat the fluid to be infused through the perforations and one or more doors in the housing to load and unload vegetable product.

In another aspect of the invention, a dryer for drying vegetable product, such as coffee beans, has a housing. The housing has a drying chamber, a fluid intake port, and a fluid exhaust port all located along a fluid flow path. The intake port and the exhaust port are oriented such that the fluid flow path is substantially vertical. Support members of the housing provide channels oriented in the direction of the fluid flow path.

Preferred embodiments of this aspect of the invention include adjustable support members to adjust the channels relative to the vertical direction. The channels are constructed and arranged to conduct produce from a higher level relative to a ground level to a lower level relative to the ground level.

Embodiments according to the invention may have one or more of the following advantages. The dryers produce all of the energy required to dry the vegetable product and, thus, incur no additional energy costs. Additionally, some dryers, such as those including Stirling engines, produce all of the energy required to dry vegetable product and perform other functions such as milling and sorting. The dryers do not require wood as a fuel. The dryers can be operated 24 hours per day. The dryers allow growers to efficiently dry coffee beans in a manner that preserves the quality of the coffee beans. The dryers add value to the coffee harvest. The dryers allow the coffee harvest to be dried at the location of the harvest. The dryers allow the coffee beans to be dried apart from coffee beans harvested from other locations such that the dried harvest can be classified, for example, according to variety, altitude, or plantation. The dryers allow coffee beans to be stored until they can be sold in a favorable market. The dryers are cost effective. The dryers contribute to economically sustainable coffee production. The dryers preserve the environment.

Other features, objects and advantages will become apparent from the following detailed description when read in connection with the accompanying drawings in which.

Figure 1:
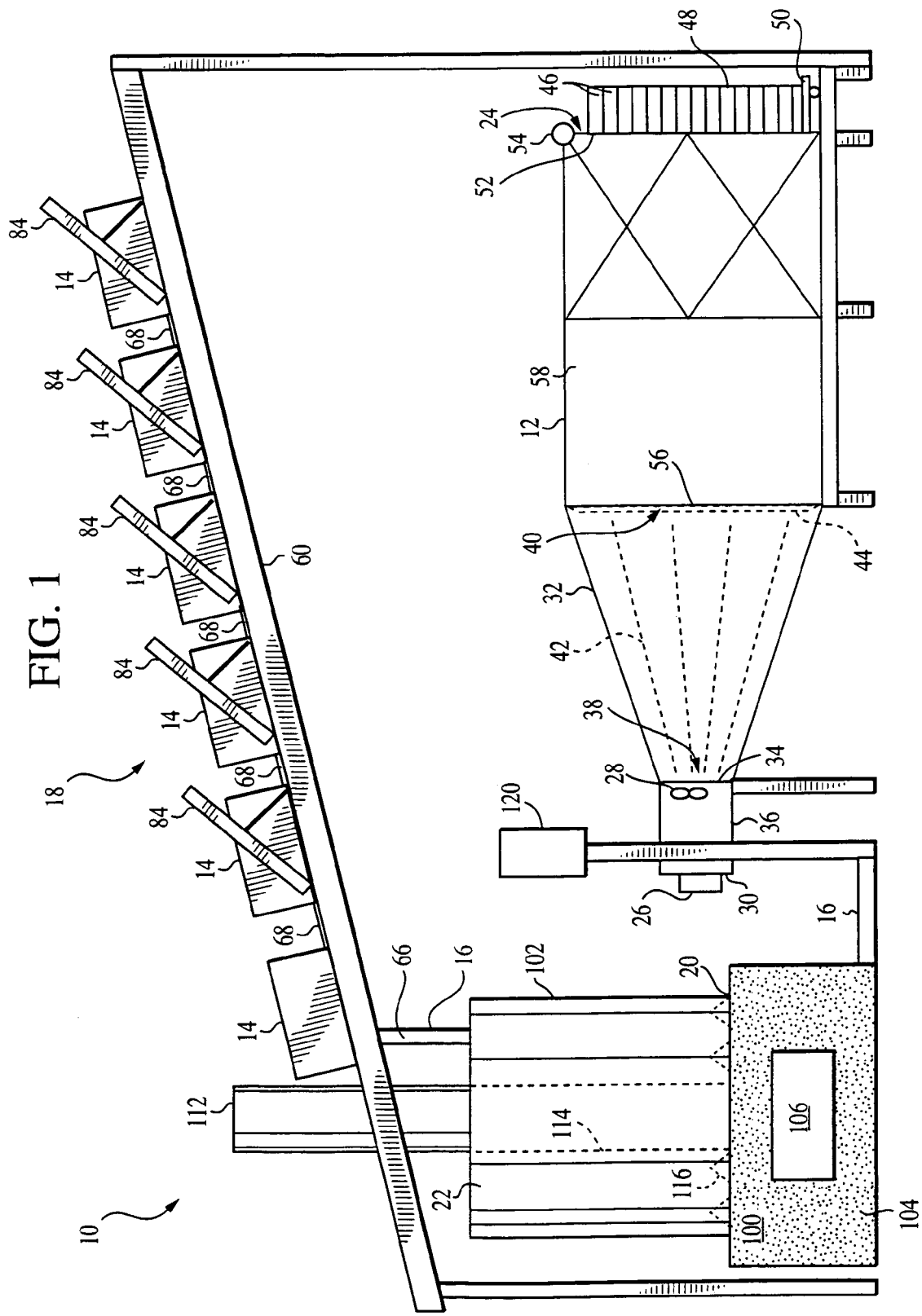
FIG. 1 is a schematic view of a solar coffee dryer according to the invention with some features shown in phantom.

Referring to FIG. 1, a dryer 10 suitable for drying vegetable product, particularly newly harvested coffee beans, includes a housing 12, an array of six thermal collectors 14, a heat transfer system 16, a photovoltaic conversion system 18, and a thermal augmentation system 20. Dryer 10 consumes both thermal and electrical energy. Thermal collectors 14 supply thermal energy, which dries produce, such as coffee beans, within housing 12. Photovoltaic conversion system 18 supplies electrical energy, which powers dryer 10. Heat transfer system 16 is in thermal communication with thermal collectors 14 and housing 12 to transfer heat from thermal collectors 14 to housing 12.

Housing 12 includes an intake 26, a blower 28, a water-to-air heat exchanger 36 and a drying chamber 24, where the coffee beans or other produce are dried. Housing 12 has, for example, a welded frame of $13/16$-inch square steel tubing with galvanized sheet metal (or aluminum) bonded to both the inner and outer surfaces, which provides a cavity for insulating material (not shown). The external dimensions of housing 12 are, for example, 73 inches in length and width, and 50 inches in height.

Intake 26 has an opening in a front end 30 of housing 12. Intake 26 is, for example, a pair of cylindrical metal conduits. An air diffuser 32 mounts to a front face 34 of housing 12 directly behind intake 26. Air diffuser 32 is, for example, galvanized sheet metal within an insulating layer of material, such as styrofoam. The inlet of diffuser 32 includes water-to-air heat exchanger 36.

Diffuser 32 extends between an opening 38 in water-to-air heat exchanger 36 and an airflow entrance 40 of drying chamber 24. Opening 38 is, for example, 12 inches high by 21.6 inches wide. Airflow entrance 40 is, for example, 45 inches high by 72 inches wide. Diffuser 32 typically spans a length of 100 inches.

Diffuser 32 includes guide vanes 42 (shown in phantom). Guide vanes 42 expand the air flow in both the vertical and horizontal directions without inducing boundary layer separation within the air flow. In addition, guide vanes 42 ensure a uniform exit flow and a high pressure recovery coefficient. A screen 44 (shown in phantom) extends across airflow entrance 40 of drying chamber 24 to provide additional diffusion of the airflow through drying chamber 24.

Drying chamber 24 contains trays 46, which hold the coffee beans during the drying process. Trays 46 are, for example, heavy galvanized $1/4$-inch square wire mesh sections that are mounted to three wooden beams running lengthwise in the direction of air flow. Alternatively, other materials, such as plastic or stainless steel, can be used. The wood beams of the trays 46 are, for example, 1 inch high, $2/3$-inches wide, and 33 inches long. The total area of each tray 46 that is available to support coffee beans is typically 726 square inches. The wire mesh is bonded to the bottoms and ends of the wood beams with heavy staples and epoxy resin. Each tray 46 is typically 33 inches long and 24 inches wide. To increase rigidity of the trays 46, each tray 46 has a double fold of wire mesh in the cross beam direction, i.e., transverse to the air flow, at both ends of the beams.

Trays 46 rest in a stack 48, one tray 46 upon another tray 46. Each stack 48 rests on a platform 50 that has rollers to provide mobility without unstacking trays 46. Each stack 48 typically contains 40 trays 46 and is 45 inches in height.

A back side 52 of drying chamber 24 is covered with a mesh curtain 54 that allows the humid exhaust air to exit with minimal resistance and prevents foreign objects from entering and contaminating the drying coffee beans. Mesh curtain 54 rolls up, as shown, to allow loading of the stacks 48 through the back side 52.

A far side of housing 12, which is not shown, is permanently sealed. A near side 56 of housing 12 has a removable panel 58 near the front of drying chamber 24. Removable panel 58 includes a magnetic gasket that mounts removable panel 58 to housing 12 and provides an airtight seal.

Removable panel 58 allows an operator to unload dry coffee near the front of drying chamber 24 without removing wet coffee, which is downstream of the dry coffee. After dry coffee is removed through panel 58, the operator rotates wet coffee forward toward diffuser 32 and loads additional wet coffee through the back side 52. Thus, the drying method is a semi-continuous process. In addition, the forward stack of coffee, which has a lower moisture content, is nearer diffuser 32 than the rearward stack of coffee.

Thus, an efficient humidity gradient is maintained because drier air flows over drier coffee beans while wetter air flows over wetter coffee beans. The forward stack of coffee is adjacent to the driest air. The air flowing over the rearward stack contains additional moisture from the forward stack. After the air flows over both stacks of coffee within drying chamber 24, the air is at or near saturation. If relatively wetter coffee were placed in the front of drying chamber 24 while relatively drier coffee were placed near the back of drying chamber 24, the air would absorb more moisture as it flowed over the first stack of coffee in the back of drying chamber 24. The moisture would narrow the moisture gradient between the air and the drier coffee. Thus, the drying time for the coffee may increase under certain conditions.

Thermal collectors 14 are in thermal communication with drying chamber 24, and provide up to 100% of the thermal energy needed in the drying process by collecting solar energy from the sun and converting the solar energy to thermal energy. Thermal collectors 14 reside on the sloped portion of a roof 60, which orients thermal collector 14 toward the sun. The most efficient orientation will vary depending on weather patterns and the geographic latitude where the dryer 10 is used. As shown, dryer 10 includes six thermal collectors 14, but dryer 10 may contain more or fewer thermal collectors 14 depending on the capacity of the dryer or other factors, e.g., directness of sunlight or expected weather patters.

Figure 2:
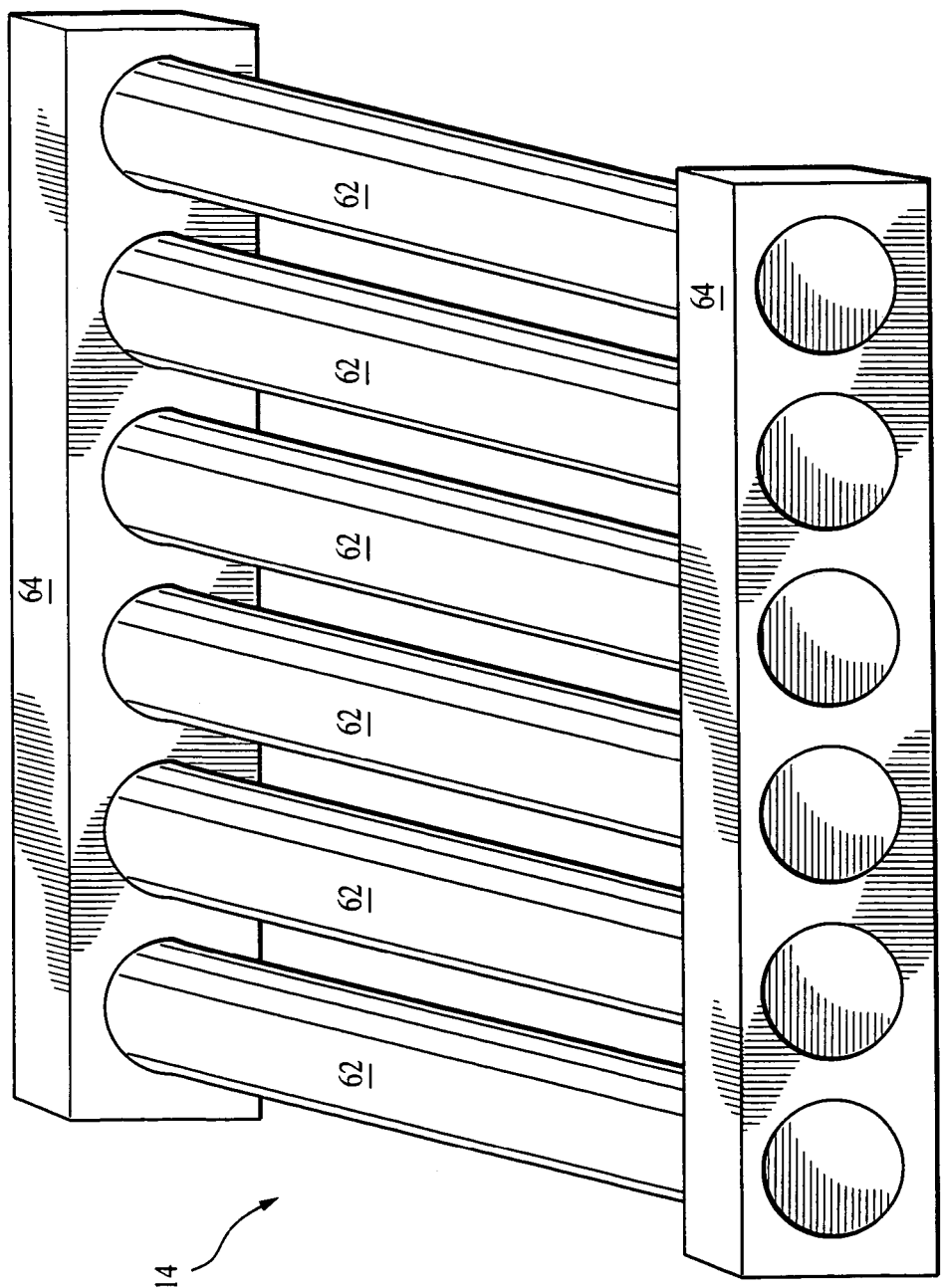
FIG. 2 is a perspective view of a thermal collector used in the solar coffee dryer of FIG. 1.

Six thermal collectors 14 are mounted above the diffuser 32 and drying chamber 24. Each thermal collector 14 is an evacuated tube thermal collector, as shown in FIG. 2, that includes a set of tubes 62 mounted to a rack 64. Tubes 62 are typically 117 inches long and 39 inches wide. Rack 64 is typically 108 inches in length and 37-¾ inches in width. Alternatively, it may be preferable to substitute an array of eight flat plate thermal collectors, such as those available from American Energy Technologies, Inc. of Green Cove Springs, Fla., for the six evacuated tube thermal collectors 14.

One end of each evacuated tube 62 connects with a manifold 66, shown in FIG. 1. Manifold 66 connects thermal collectors 14 in parallel to the heat transfer system. The manifold connects thermal collectors 14 with ¾-inch hose tubing 68 that extends from thermal collectors 14 to thermal storage system 22.

Figure 3:
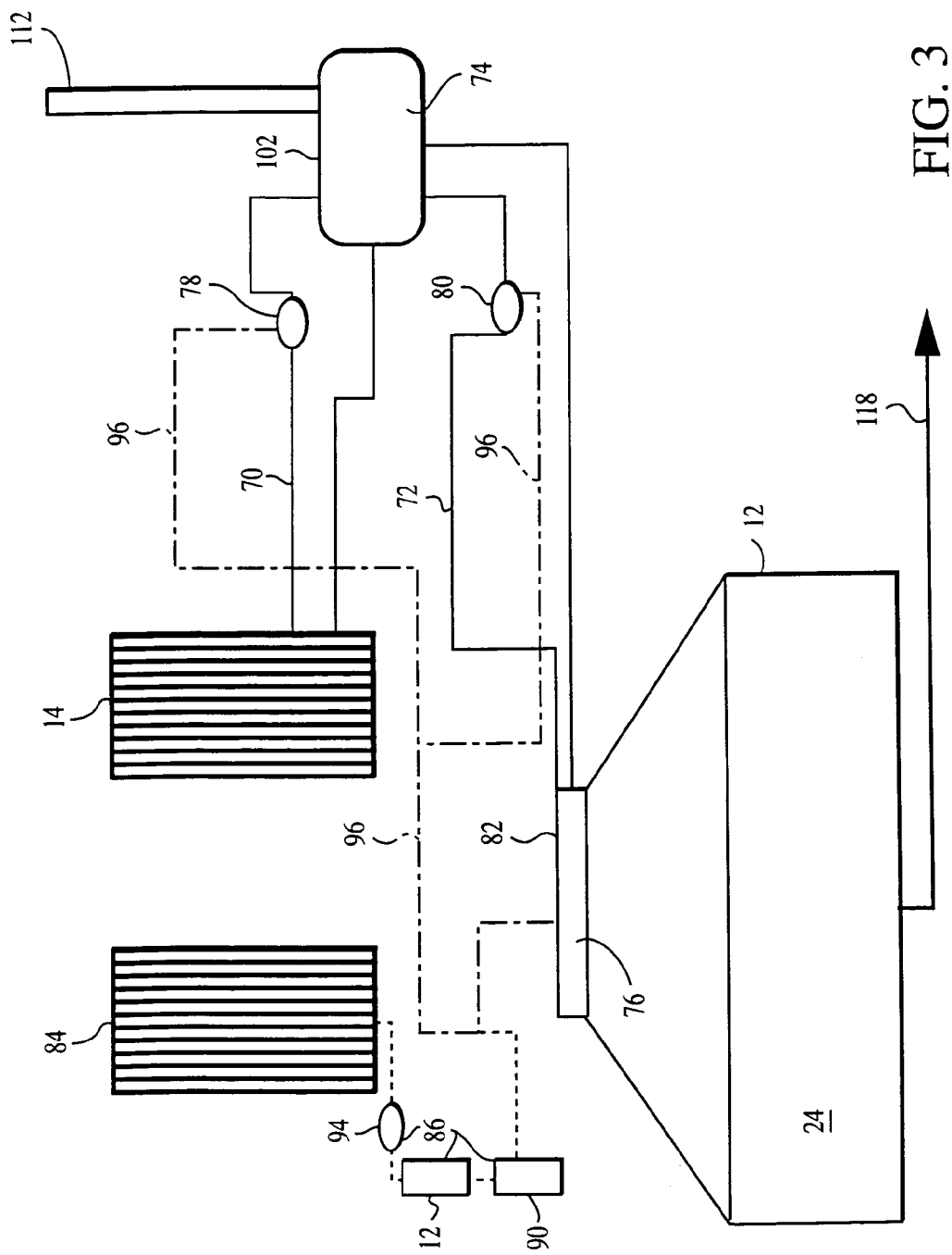
FIG. 3 is a diagrammatic view of the solar coffee dryer according to the invention.

Referring also to FIG. 3, heat transfer system 16 moves thermal energy from the thermal sources, e.g., thermal collector 14 and thermal augmentation system 20, to the drying chamber 24. The heat transfer system includes two heat transfer circuits 70, 72, two heat exchangers 74, 76, and three pumps 78, 80, 82. Solar heat transfer circuit 70 is a fluid circuit that thermally couples the thermal collector 14 to the primary heat exchanger 74. Chamber heat transfer circuit 72 is a fluid circuit that thermally couples primary heat exchanger 74 to chamber heat exchanger 76. (For example, chamber heat exchanger 76 is water-to-air heat exchanger 36 of FIG. 1.) Both heat transfer circuits 70, 72 contain a fluid heat transfer medium, for example, water.

Each heat transfer circuit 70, 72 includes a corresponding pump 78, 80. Pump 78 pumps water from thermal augmentation system 20 to thermal collectors 14 and back to thermal augmentation system 20. Pump 80 pumps water through thermal augmentation system 20 to water-to-air heat exchanger 76 and back through thermal augmentation system 20. Pumps 78, 80 are typically 120 V 0.5 amp AC pumps capable of delivering up to 3 gallons per minute and up to a head of 10 feet. Pump 82 pushes heated air through drying chamber 24. (For example, pump 82 is blower 28 as shown in FIG. 1, which includes two fans operating in parallel.) Ambient air, which enters through intake 26, is the heat transfer medium within the drying chamber. The ambient air flows through heat exchanger 76, through diffuser 32, around stacked trays 46, and out the back side 52 of the drying chamber 24. The flow of ambient air through the dryer constitutes an additional heat transfer circuit.

Figure 4:
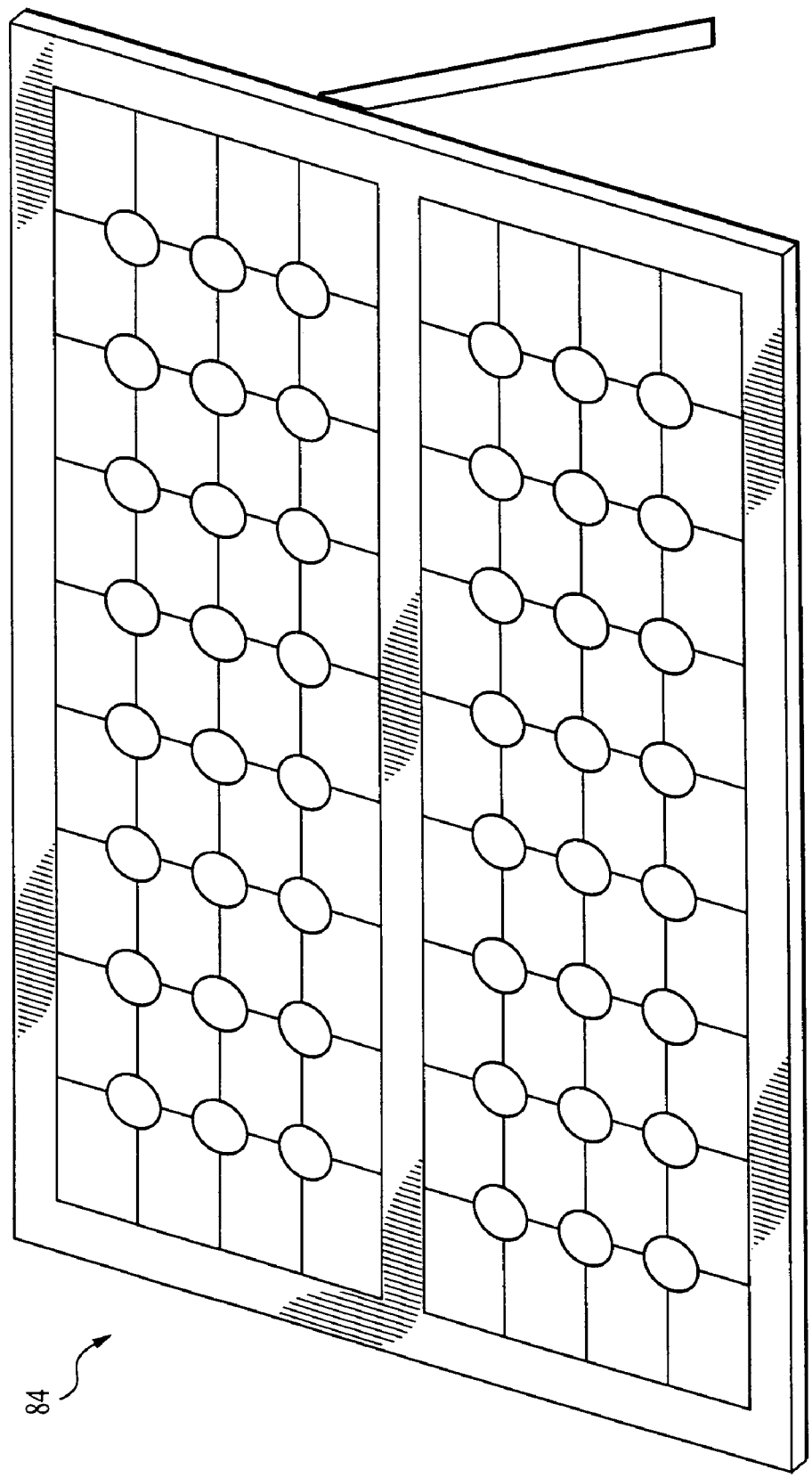
FIG. 4 is a perspective view of a photovoltaic collector used in the solar coffee dryer of FIG. 1.

Photovoltaic conversion system 18 includes an array of photovoltaic collectors 84 and a battery bank 86. Photovoltaic collectors 84, shown in greater detail in FIG. 4, are typically 12 volt, 55 watt photovoltaic solar collectors that are connected through an inverter to a 110 V AC system. Alternatively, the inverter can be eliminated and one or more DC motors can be used in the system. Alternatively, other voltages could be used, e.g., a 24 volt system.

A typical array of collectors includes ten photovoltaic collectors 84 to provide sufficient power to dryer 10 (only five photovoltaic collectors 84 being shown in FIG. 1 because the collectors 84 are arranged in two rows). However, more or fewer photovoltaic collectors 84 may be employed. Photovoltaic collectors 84 are connected in parallel and are typically mounted at a 30 degree slope relative to horizontal next to the thermal collectors 14. Photovoltaic collectors 84 are typically 50.9 inches across and 13 inches in height.

Battery bank 86 is electrically coupled by electrical lines 96 to both the photovoltaic collectors 84 and other systems, e.g., heat transfer system 16 as shown in FIG. 3. Battery bank 86 includes two batteries 90, 92 per photovoltaic collector 84. Batteries 90, 92 are connected in series through a battery charge controller 94. The batteries 90, 92 store the electrical energy produced by the photovoltaic array 84.

Photovoltaic conversion system 18 can provide all of the electrical energy that dryer 10 consumes during the drying process. In addition, dryer 10 connects to the electrical power grid as a source of supplemental power during extended periods of overcast or as a source of backup power. Batteries 90, 92 provide short storage capacity and voltage stabilization. In addition, batteries 90, 92 allow for night operation when the thermal augmentation system 20 is operating.

Thermal augmentation system 20 provides additional thermal energy for operation at night or during periods of overcast. Thermal augmentation system 20 includes a furnace 100 that is disposed beneath a thermal storage tank 102. Thermal storage tank 102 contains water, which has a relatively high specific heat and, thus, can store a relatively large amount of heat. Rocks or bricks, which also have a high heat storage capacity, can be placed in tank 102 to provide efficient heat storage, especially when used in combination with water. Thermal storage tank 102 is connected between thermal collector 14 and drying chamber 24 through 1 inch copper tubing (or PVC tubing, or hose tubing). Thermal storage tank 102 is in thermal communication within the heat transfer circuit 72 that extends between heat exchanger 74 and the water-to-air heat exchanger 76. Thus, water stored within thermal storage tank 102 flows through heat transfer circuit 72.

In an exemplary embodiment, thermal storage tank 102 typically contains 2,500 lb. of water in a tank volume of approximately 300 gallons. Thermal storage tank 102 is cylindrical, is 60 inches high by 40 inches in diameter, and is made of ⅛-inch welded steel. The periphery of thermal storage tank 102 contains insulation, for example, 3 inch fiberglass and 6 inches of rice straw or coffee parchment.

A stand of bricks 104 forms a combustion chamber 106 of furnace 100. Stand 104 holds thermal storage tank 102 twenty inches above the ground. Stand 104 forms an inner wall (not shown) and an outer wall. The inner wall is a 30-inch diameter circle, and the outer wall of stand 104 extends beyond the circumference of thermal storage tank 102. The dual wall construction of stand 104 provides additional insulation and thermal mass to combustion chamber 106 to improve the efficiency of heat transfer.

Thermal augmentation system 20 provides the balance of the drying energy not delivered by the thermal collectors. Thermal augmentation system 20 typically uses biomass as a backup fuel. When the biomass is burned in furnace 100, combustion gasses transfer heat directly to thermal storage tank 102. The combustion gasses enter chamber 106 downward in a draft through vents (not shown) on the top of chamber 106. The combustion gasses exhaust from chamber 106 through a hollow tract 114 (shown in phantom) that extends through the center of thermal storage tank 102. Tract 114 is in fluid communication with a chimney 112 that extends 15 feet above the top of thermal storage tank 102. Both tract 114 and chimney 112 are 8 inches in diameter. Chimney 112 creates a draft sufficient to sustain combustion in combustion chamber 106.

Because all heat from combustion is drawn through the center of thermal storage tank 102, tract 114 enhances the heat transfer from the combustion gasses to the water within thermal storage tank 102. In addition, the bottom of thermal storage tank 102 has heat sinks 116, for example, 3 inch heat transfer fins (shown in phantom), that extend into thermal storage tank 102.

Typically, the harvesting of coffee produces sufficient biomass, known as coffee parchment, to supply fuel for the thermal augmentation system 20. Thus, additional resources are not required to fuel dryer 10. However, combustion chamber 106 can also burn wood if required, e.g., approximately 12 pounds of wood fuel per hour.

Thermal storage tank 102 stores heat energy generated by both thermal collector 14, which is a primary heating source, and furnace 100, which is an auxiliary heating source, until the heat energy is needed in drying chamber 24. The temperature of the water in thermal storage tank 102 is approximately 150° F. When drying chamber 24 is operating, the thermal energy stored in thermal storage tank 102 is transferred to the air drawn through intake 26 by a pump, i.e., blower 82. Blower 82 pushes the air through the water-to-air heat exchanger 36. The temperature gradient between the hotter water and the cooler air causes the thermal energy to diffuse into, and heat, the ambient air. The ambient air is typically 85° F. with a relative humidity of 51%, and the heated air is typically 125° F. with a relative humidity of 20%. The air at an exhaust port 118 (shown schematically in FIG. 3), i.e., back side 52 of drying chamber 24 (FIG. 1), is typically 101° F. with a relative humidity of 45%.

Dryer 10 operates during daylight for ten hours each day during the entire coffee harvest. On a partially overcast day, solar radiation is typically 1,847 Btu/(day*square feet). During the ten hour time-period on a partially overcast day, dryer 10 does not require additional biomass fuel.

During this period, coffee is loaded into drying chamber 24 at back side 52. The coffee is dried for one day in the second row of stacked trays 46 and, then, is rotated to the first row of stacked trays 46 for one additional day. At the end of each day, stacks 48 are monitored and turned 180 degrees to ensure even drying. At the end of two days, the coffee is removed and packaged in 100 lb. sacks.

Using this method of rotation over ten hour operation periods, dryer 10 produces 1000 pounds of dry coffee every two days. The throughput of dryer 10 is approximately 1000 sacks, i.e., 100,000 pounds, of coffee per harvest season. In addition, dryer 10 can be operated continuously to produce up to 2400 pounds of dry coffee beans every two days.

Other embodiments are within the scope of the claimed invention.

Figure 5:
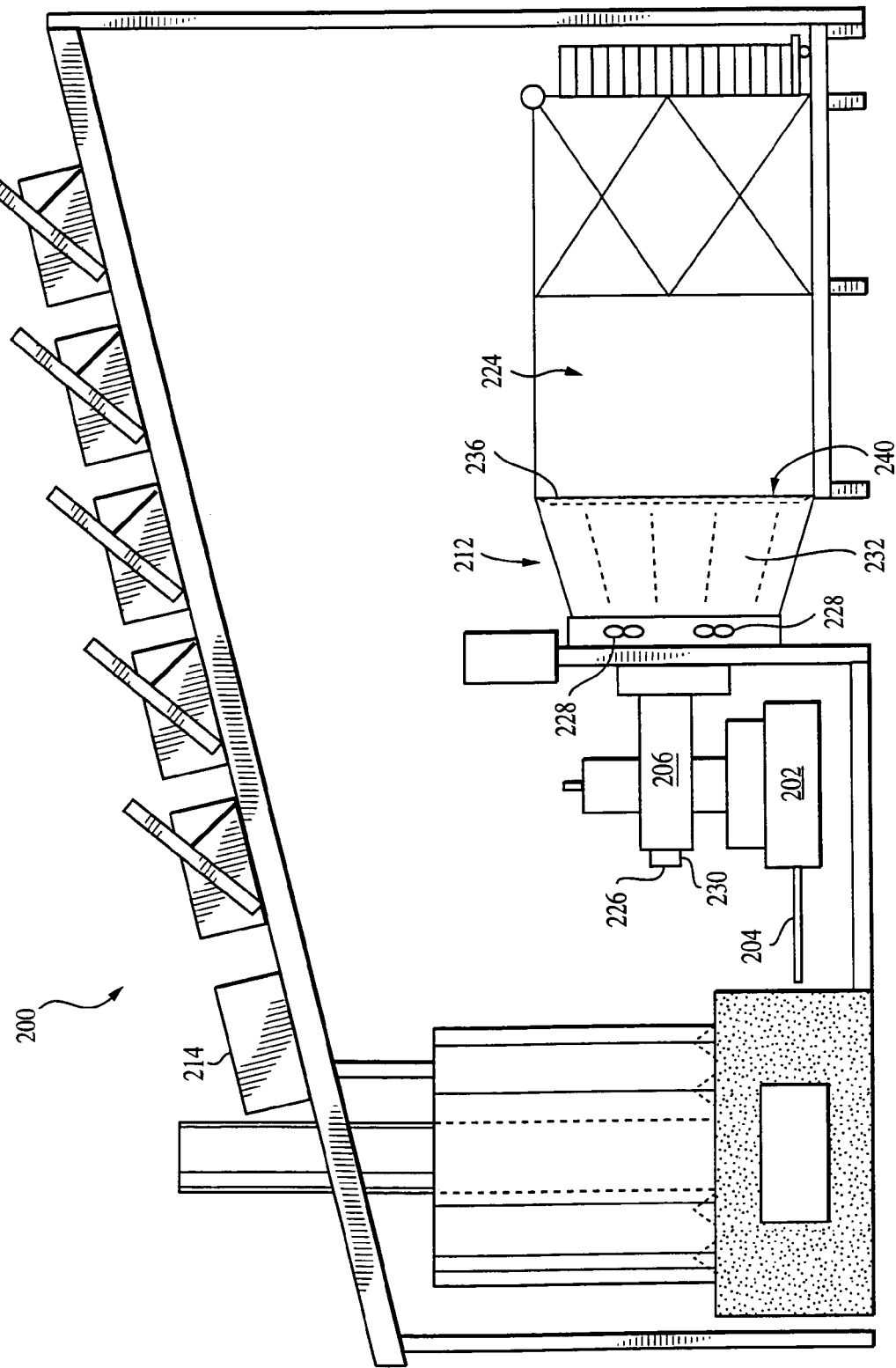
FIG. 5 is a schematic view of an alternate embodiment of the solar coffee dryer of FIG. 1, wherein the dryer includes a Stirling engine as an additional energy source.

In another embodiment, referring to FIG. 5, a dryer 200 that is similar to dryer 10 includes a Stirling engine 202 and an alternative housing 212 that may be preferable to housing 12. Housing 212 includes an intake 226, two blowers 228, a water-to-air heat exchanger 236 and a drying chamber 224, where the coffee beans or other produce are dried. The structure of housing 212 is similar to housing 12, but the position and structure of a water-to-air heat exchanger 236 is moved directly adjacent to opening 240. Thus, a front end 230 of dryer 200, particularly an air diffuser 232, of housing 212 is truncated relative to housing 12 and air diffuser 32 both of dryer 10.

Intake 226 is, e.g., a pair of cylindrical metal conduits. Air diffuser 232 mounts directly behind intake 226. Like air diffuser 32, air diffuser 232 is, for example, galvanized sheet metal within an insulating layer of material, such as styrofoam. However, water-to-air heat exchanger 236 is located at the outlet of air diffuser 232 rather than the inlet, i.e., at airflow opening 240 of drying chamber 224. Airflow opening 240 is, for example, 45 inches high by 72 inches wide.

Stirling engine 202 is attached to front end 230, and allows dryer 200 to provide additional power for other coffee processing such as sorting and milling which occur after drying is complete. Alternatively, Stirling engine 202 could be attached to front end 30 of dryer 10 for the same purpose. Stirling engine 202 is, e.g., an STM4-120 external combustion engine and generator set that is manufactured by Stirling Thermal Motors, Inc. of Ann Arbor, Mich. and that provides 25 kW of electrical energy at 1800 rpm. Electrical line 204 connects Stirling engine 202 to the photovoltaic conversion system 18 and other electrical devices such as milling and sorting machines. With Stirling engine 202, dryer 200 provides sufficient energy to accommodate all coffee processing without using other external power sources such as the local electrical power grid (i.e., dryer 200 is known as an "off-grid" system).

Stirling engine 202 is powered by, e.g., burning coffee parchment. However, Stirling engine 202 is an external combustion engine that is adaptable to be powered by other heat sources. Thus, dryer 200 can be configured to power Stirling engine 202 with thermal energy from the existing thermal collectors 214 or additional thermal collectors could be added. Also, Stirling engine 202 could be powered by heat from thermal augmentation system 20.

Dryer 200 includes an additional heat exchanger 206 that recaptures exhausted heat from Stirling engine 202. Heat exchanger 206 acts as an intake into housing 212 to pass ambient air over the heated exhaust surfaces of Stirling engine 202. Therefore, heat exchanger is able to recapture, e.g., 50,000 BTU per hour.

Figure 6:
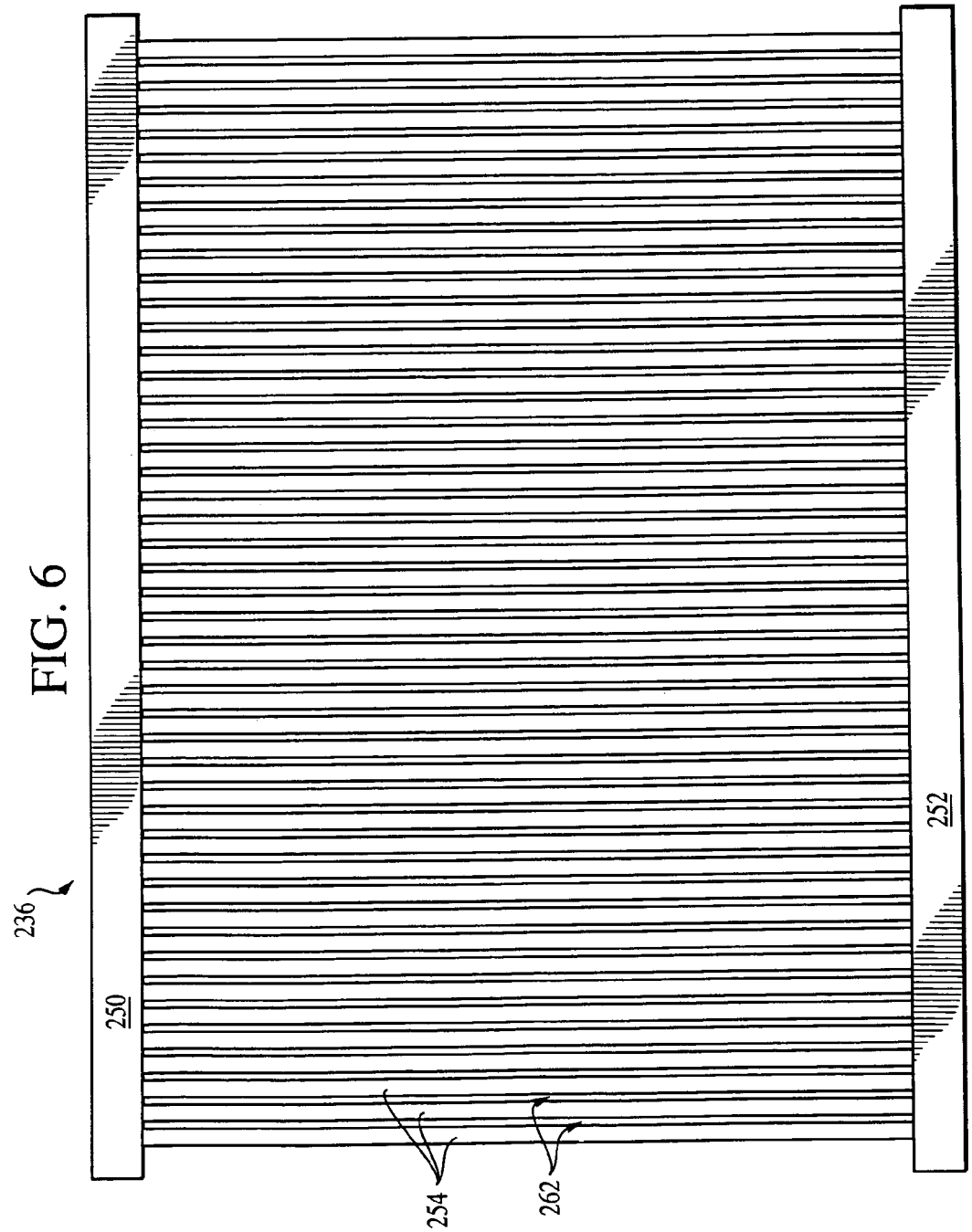
FIG. 6 is a front schematic view of a water-to-air heat exchanger included in the dryer of FIG. 5.
Figure 7:
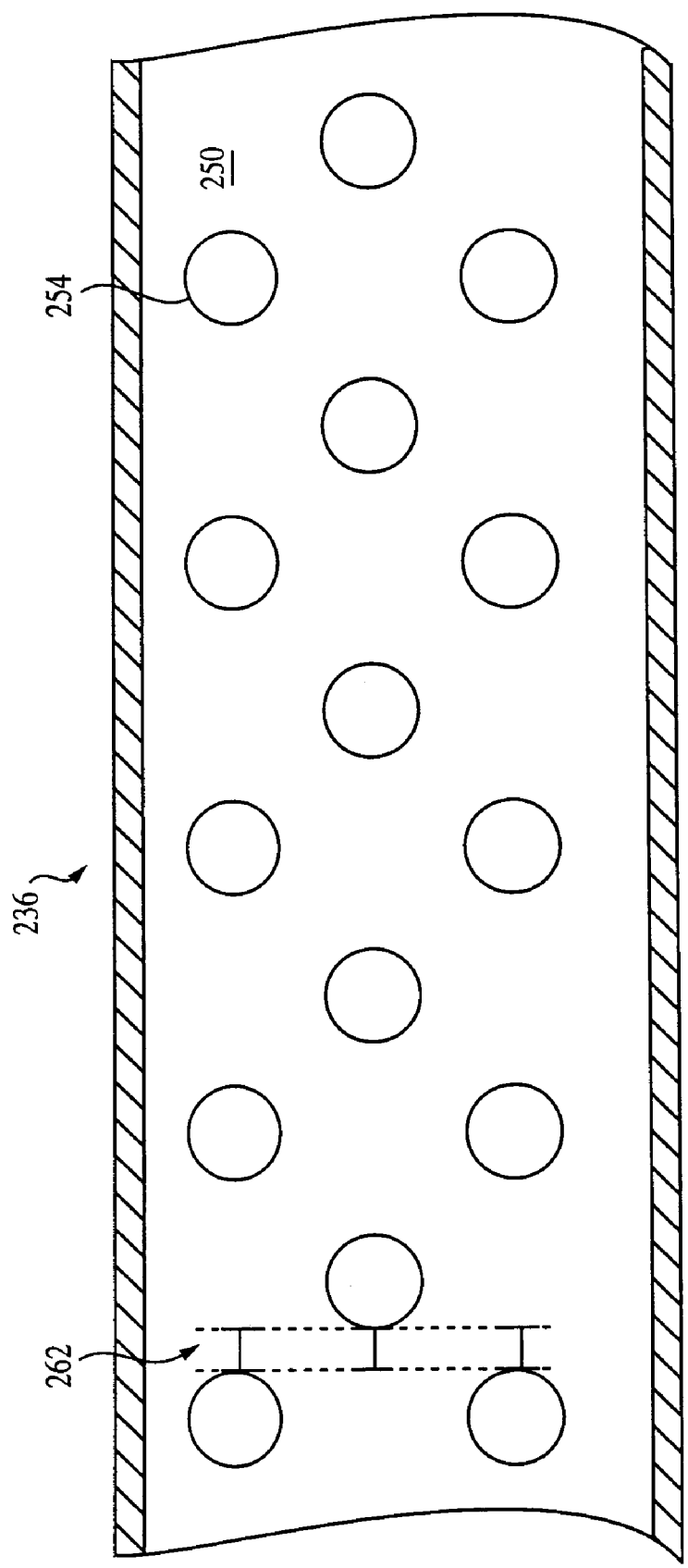
FIG. 7 is a top cross sectional view of the water-to-air heat exchanger of FIG. 6.

Referring to FIGS. 6–7, water-to-air heat exchanger 236 includes an upper flow tube 250, a lower flow tube 252, and an array of capillary tubes 254 connected between flow tubes 250, 252. All tubes 250, 252, 254 can be made of, e.g., copper or plastic. Heat exchanger 236 is sized to cover entire opening 240 in a generally planar arrangement having flow tubes 250, 252 extending horizontally across opening 240 and capillary tubes 254 extending vertically across opening 240. Water flows into lower flow tube 252 and disburses into capillary tubes 254 to flow upward and into upper flow tube 252. Water exits heat exchanger 236 through upper flow tube 250.

As shown most clearly in FIG. 7, capillary tubes 254 are arranged in three rows 256, 258, 260 that are staggered relative to the adjacent rows. Each capillary tube 254 is approximately ⅛" inch wide and a lateral space 262 between each capillary tube is ¹⁄₁₆". The size and arrangement of capillary tubes 254 diffuses air pumped across heat exchanger 236 and into chamber 224. The staggered arrangement provides more space for air to flow between the tubes than would be available if capillary tubes 254 were aligned in a single row, and the arrangement alters the path of the air as the air flows around the tubes to create a diffuse airflow. Alternatively, if additional capillary tubes were extended horizontally across opening 240 in a similar arrangement, the airflow pattern could be diffused in both the horizontal and vertical directions.

The structure of water-to-air heat exchanger 236 may reduce the boundary layer separation and the convection effect of heated air entering drying chamber 224.

Therefore, air flow into drying chamber 224 may be more efficient, and the need for diffuser 232 may be reduced or eliminated. Diffuser 232 includes guide vanes 242 (shown in phantom). Like guide vanes 42 of dryer 10, guide vanes 242 expand the air flow in both the vertical and horizontal directions without inducing boundary layer separation within the air flow. In addition, guide vanes 242 ensure a uniform exit flow and a high pressure recovery coefficient.

However, due to the structure of heat exchanger 236, the number of guide vanes 242 could be reduced, or guide vanes 242 could be eliminated. Similarly, screen 44 of dryer 10 is not present in dryer 200, but could be included in an alternate configuration.

Figure 8:
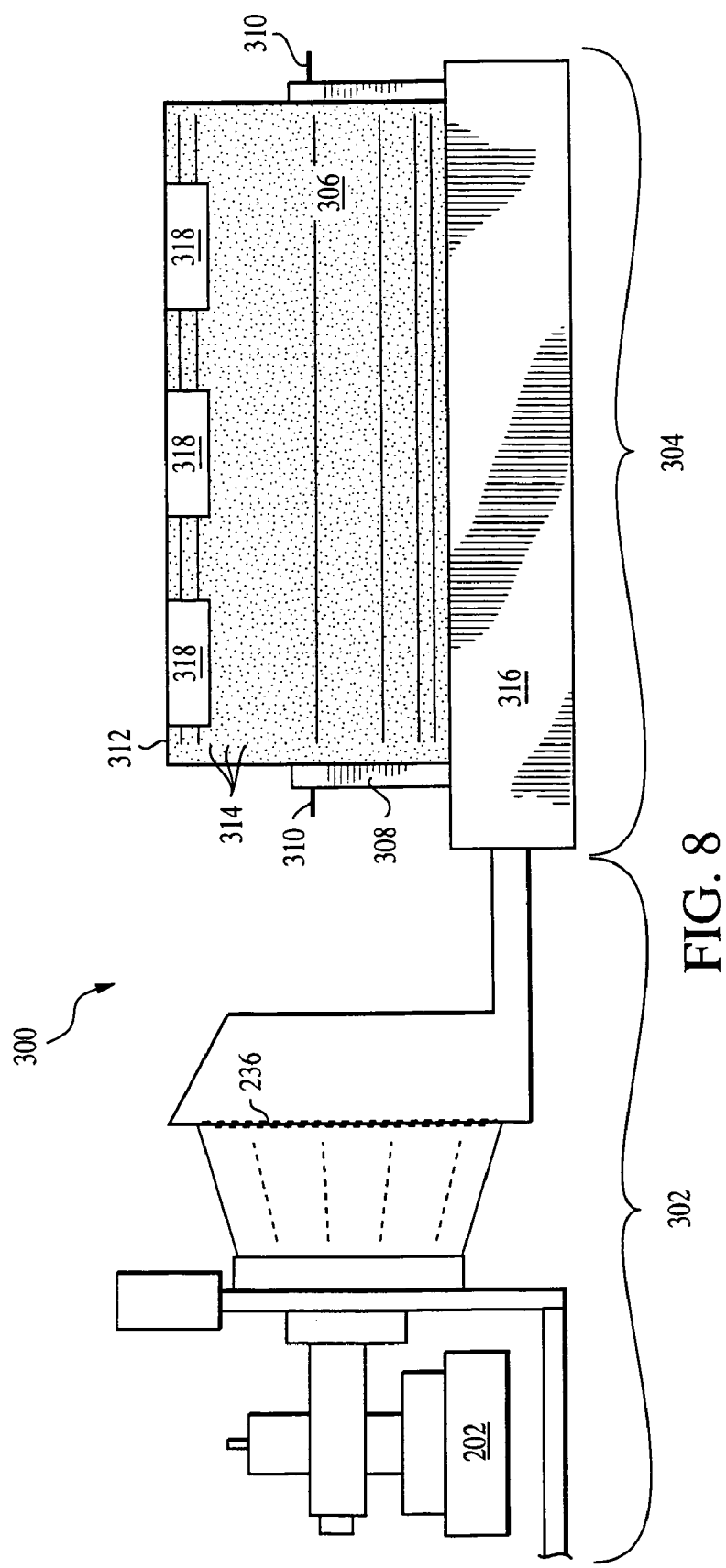
FIG. 8 is a schematic view of another embodiment of the solar coffee dryer of FIG. 1, wherein the dryer includes a rotating drum that houses a drying chamber.
Figure 9:
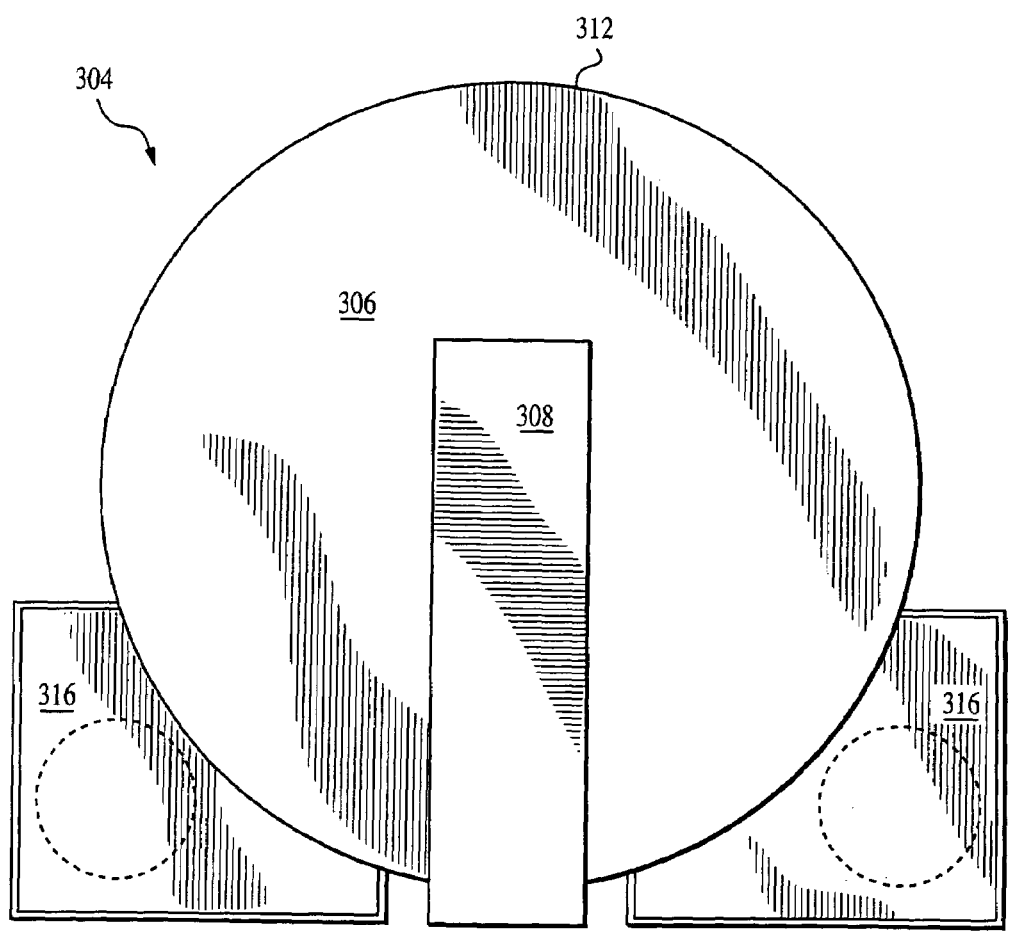
FIG. 9 is an end schematic view of the rotating drum of FIG. 8.

As an example of another embodiment within the scope of the claims, referring to FIGS. 8–9, a dryer 300 is similar to dryer 10, but, rather than a housing 12, dryer 300 includes a heat transfer section 302 and a drying chamber section 304. Heat transfer section 302 includes the same water-to-air heat exchanger 36 as dryer 10 with dual-cylinder intake 26 and blower 28. However, drying chamber section 304 includes a cylindrical rotating drum 306 that accommodates coffee beans or other vegetable produce.

Rotating drum 306 attaches to mounting stand 308 at either end and rotates about a longitudinal axis 310 during operation of dryer 300. Drum 306 is made of, e.g., stainless steel that is of an appropriate thickness to accommodate the predesigned size of drum 306. A periphery 312 of drum 306 includes perforations 314 that both act as intakes for heated air and as exhaust ports for air laden with moisture from, e.g., coffee beans being dried within drum 306. Perforations 314 are circular having a radius of ⅛" to accommodate coffee beans which typically are slightly more than ¼" across after drying.

Drum 306 rotates directly adjacent to two air infusers 316 that lie on either side of drum 306. Drum 306 rotates, e.g., at a rate of one rotation per minute, and the infusers 316 infuse heated air into drum 306 through perforations 314 that are adjacent to infusers 316. On the other hand, perforations 314 opposite infusers 316 act as exhaust ports after the heated air is pushed through the coffee beans. As drum 306 rotates, perforations 314 alternate from being intake ports and exhaust ports.

A set of doors 318 extend along the periphery of drum 306. When the doors are oriented in the upward direction, coffee beans or other vegetable product can be loaded into drum 306. When the doors are oriented in the downward direction, coffee beans or other vegetable product can be unloaded.

Figure 10:
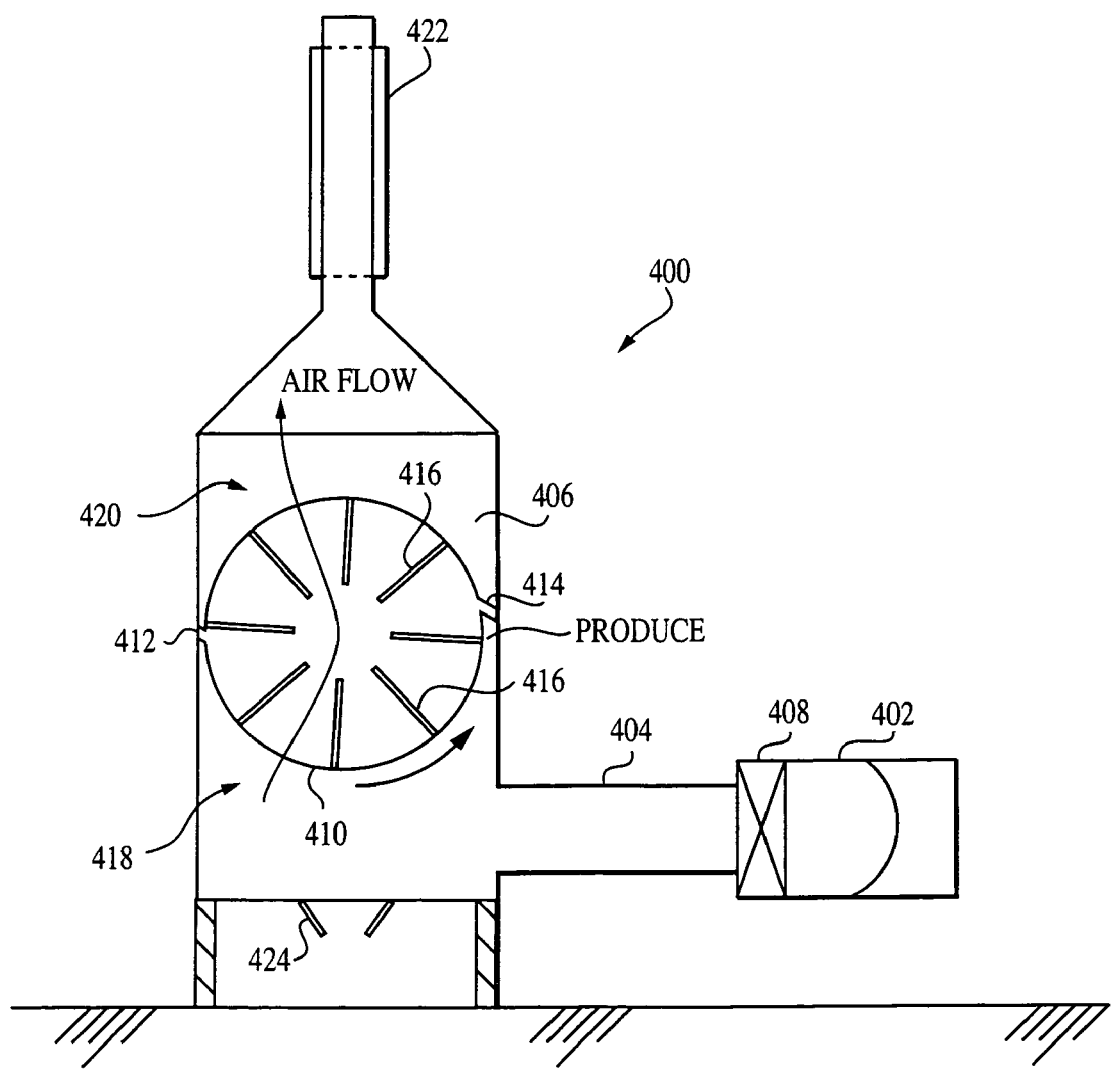
FIG. 10 is a cross-sectional schematic view of an alternate embodiment of the dryer of FIG. 8.

Referring to FIG. 10, dryer 400 is another embodiment of dryer 300. As with dryer 300, dryer 400 includes a perforated rotating drum 406 rather than drying trays. Drum 406 rotates at a rate that ranges between one and two rotations per minute. A Stirling engine 402 burns biofuels, such as coffee parchment, to provide both heat to dry produce within the drum and electricity to rotate drum 406 during the drying process. Rotating drum 406 has a capacity within the range of, e.g., 3,000 lbs. to 9,000 lbs.

Stirling engine 402 transfers heat to rotating drum 406 through a gas—gas heat exchanger 404. A pump 408, e.g., a fan, moves heated air, e.g., 45° C.–50° C., from heat exchanger 404 into drum 406. Pump 408 moves the heated air through rotating drum 406 by generating a high pressure zone 418 that creates a positive pressure gradient forcing heated air through the coffee beans located in rotating drum 406. Two gaskets 412, 414 extend from a wall 426 to the outer surface of rotating drum 406. Gaskets 412, 414 lie on either side of rotating drum 406 to direct the heated air through rotating drum 406. Dryer 400 also includes two additional gaskets (not shown) at the flat ends of drum 406 that, in conjunction with gaskets 412, 414, provide a seal around drum 406.

Pump 408, heat exchanger 404, gaskets 412, 414 and high pressure zone 418 collectively provide an infuser that infuses heated air into the lower side of drum 406. Once infused into drum 406, the heated air circulates through the coffee beans into a zone 420 of relatively lower pressure. From the lower pressure zone 420, the heated air exists dryer 400 through a solar chimney 422 that accentuates the upward draft of air by using sunlight to further heat the air within chimney 422.

Rotating drum 406 includes internal baffles 416 that are spaced equidistantly inside an outer perimeter 410 of rotating drum 406. Baffles 416 lift coffee beans, or other produce, that are placed inside rotating drum 406. Thus, as rotating drum 406 rotates, baffles 416 stir the coffee beans to redistribute the beans to a central location within rotating drum 406.

The coffee beans are loaded into dryer 400 in a manner similar to dryer 200. The coffee beans are unloaded through a door 424 that extends along the underside of dryer 400.

Figure 11:
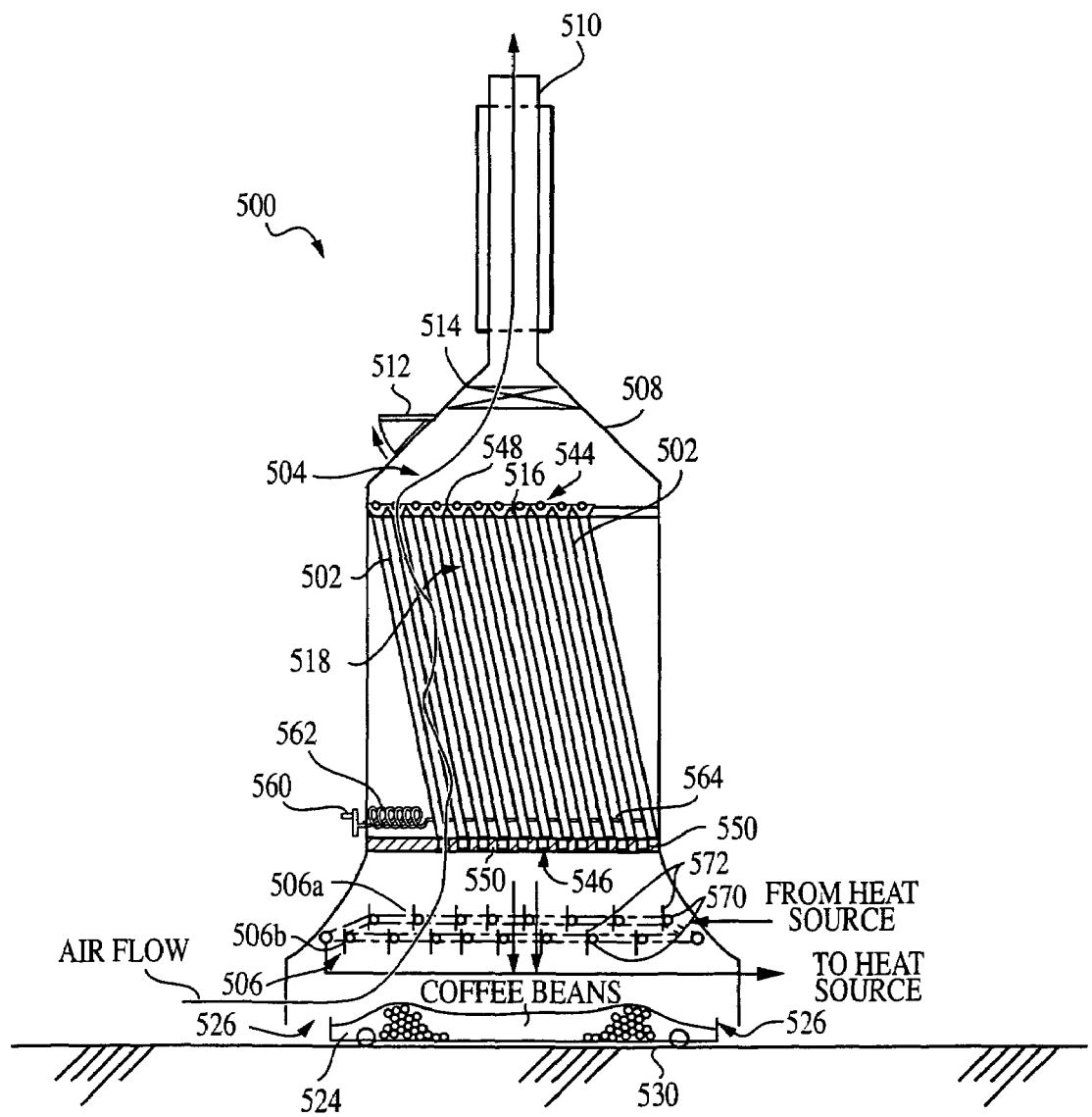
FIG. 11 is a cross-sectional schematic view of an alternate embodiment of a dryer similar to the dryer of FIG. 1, wherein a fluid flows in the vertical direction.
Figure 12:
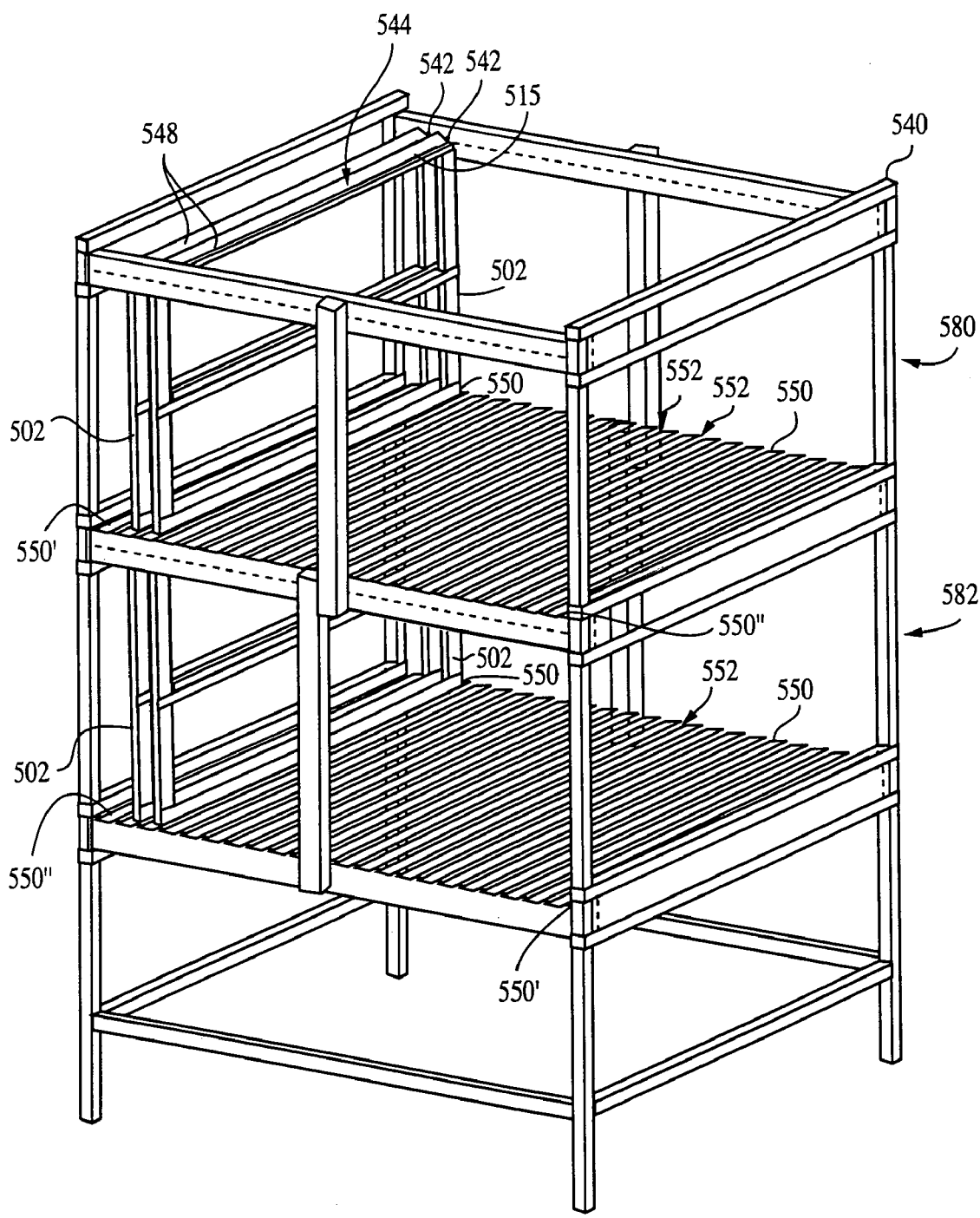
FIG. 12 is a perspective view of a support framework and drying trays of the dryer of FIG. 11, wherein an alternate arrangement of two rows of drying trays is illustrated rather than a single row of drying trays as shown in FIG. 11.

Referring to FIGS. 11 and 12, a dryer 500 has a vertical orientation to utilize convective currents of air rising upward and to utilize gravity to simplify produce loading, drying, and unloading. Dryer 500 includes vertical drying trays 502, an upright drying chamber 504, a water-to-air heat exchanger 506, a dome section 508, and a solar chimney 510. Dome section 508 further includes a loading gate 512 and a pump 514, e.g., a fan.

Vertical drying trays 502 are located within drying chamber 504. Drying trays 502 are mounted to provide substantially vertical drying channels 518. Each drying tray 502 is attached to a drying tray support framework 540 (FIG. 12) of drying chamber 504. Support framework 540 is, e.g., approximately 85" in length, 86" width, and 40" in height. Two hinges 542 attach each drying tray 502 on respective ends of an upper edge 516 of drying trays 502.

Drying trays 502 are constructed of a metal frame surrounded by a metal mesh. Drying trays 502 have a top opening 544 and a bottom opening 546 to allow coffee beans to pass into and out of drying trays 502, e.g., during loading and unloading. Each drying tray 502 is, e.g., approximately 3' in height and 6' in length, and each drying channel 518 is approximately 1.19" wide.

Baffles 548 are disposed across the spaces located between adjacent drying trays 502. Baffles 548 guide the coffee beans into drying trays 502 and prevent the coffee beans from entering the spaces between drying trays 502. Each baffle 548 is made of a metal mesh. Each baffle 548 is supported along upper edges 516 of the adjacent drying trays 502—one drying tray 502 supports one edge of a corresponding baffle 548 and the adjacent drying tray 502 supports the opposite edge of the corresponding baffle 548. Each baffle 548 is articulated with the adjacent drying trays 502 to allow baffle 548 to move as drying trays 502 rotate about hinges 542.

As shown most clearly in FIG. 12, drying trays 502 hang above a set of slats 550 of support framework 540. Slats 550 are parallel and have uniformly spaced openings 552 between adjacent pairs of slats 550. When coffee beans are drying within dryer 500, drying trays 502 hang downward with each bottom opening 546 directly adjacent to a respective slat 550. Slats 550 are wider than bottom opening 546. Thus, slats 550 completely cover corresponding bottom openings 546 and secure the coffee beans within drying trays 502.

Coffee beans are loaded through loading gate 512, which is a hinged door at the outer surface of dome section 508. The coffee beans pour over baffles 548 and into vertical drying trays 502. The force of gravity causes the coffee beans to move downward toward a ground level 530 through channels 518 defined by drying trays 502. After drying trays 502 are filled, the coffee beans are dried.

To dry the coffee beans, heated air flows through the channels and around the coffee beans in the channels before exiting through solar chimney 510. The metal mesh of drying trays 502 allows the heated air to mix by traveling between the empty space between drying trays 502 as well as the space of channels 518 that contains the coffee beans or other produce.

Additionally, the angle of incidence of the airflow against drying trays 502 can be adjusted to increase or decrease the drying time of the coffee beans. The angle of incidence can be adjusted by changing the angle of drying trays 502. For example, drying trays 502 can be rotated about corresponding hinges 542 within a range of 0°–2.5° relative to the vertical direction. An increased angle of incidence may accelerate the drying process. A decreased angle of incidence may decelerate the drying process.

Drying coffee beans quickly increases output of the dryer. However, drying coffee beans too quickly, especially by elevating the temperature, may decrease the quality of the coffee beans. Thus, preferably, a balance between drying time and produce quality is maintained. The information provided with respect to dryer 10 (i.e., drying times (e.g., two days total), drying temperatures (e.g., 125° F. heated air), and drying procedures (e.g., rotating dried, partially dried, and wet coffee beans)) also is thought to be applicable to the vertical dryer 500.

To remove dry coffee beans from drying trays 502, drying trays 502 are rotated about hinges 542. A crank 560 (FIG. 11) attaches to a screw 562 (e.g., a threaded shank) that rotates and pushes against the first drying tray 502 in the of the row of drying trays 502. A push-rod 564 (FIG. 11) connects each drying tray 502 to the other drying trays 502 in the row. Thus, crank 560 (FIG. 11) can position all drying trays 502 in the row at the desired angle relative to the vertical direction.

When drying trays are positioned from 0° (i.e., a vertical position) to 2.5° relative to the vertical position, slats 550 cover corresponding bottom openings 546 and contain the coffee beans within drying trays 502. As drying trays 502 begin to move beyond 2.5°, the coffee beans will begin to fall from the drying trays 502 through openings 552. In this manner, the coffee beans exit the bottom of dryer 500 (as shown in FIGS. 11 and 12).

Referring again to FIG. 11, when the coffee beans are removed, the coffee beans fall through heat exchanger 506 and into a hopper 524. Hopper 524 is, e.g., an open car that rolls underneath dryer 500 through a space 526 between the bottom of dryer 500 and the ground. Hopper 524 facilitates easy unloading of coffee beans without interrupting the drying process.

Heat exchanger 506 is positioned at the bottom of drying chamber 504, and extends the entire length and width of drying chamber 504. Heat exchanger 506 includes a set of parallel tubes 570 with heat radiating fins 572 attached along tubes 570. Tubes 570 and fins 572 are spaced to allow the beans to fall freely through heat exchanger 506 and into hopper 524. Fins 572 are corrugated but, alternatively, may be flat.

To improve heat transfer, heat exchanger 506 includes two identical partial heat exchangers 506a, 506b. One partial heat exchanger 506a is disposed above the other partial heat exchanger 506b. Tubes 570 and fins 572 of upper heat exchanger 506a are staggered relative to lower heat exchanger 506b. The lower portion of fins 572 of upper heat exchanger 506a extend downward and between the upper portion of fins 572 of lower heat exchanger 506b. All fins 572 of both partial heat exchangers 506a, 506b are equidistantly spaced relative to the adjacent pair of fins 572 to provide equally sized openings for the coffee beans to fall through and for the ambient air to flow through.

In operation, stored heat travels through a heat transfer circuit that is in thermal communication with one or more heat sources, e.g., a Stirling engine, a heat storage tank, and a set of flat plate connectors. In dryer 500, for example, the heat transfer circuit can be configured in a manner similar to the heat transfer circuits of dryer 10 or dryer 200.

However, dryer 500 moves air primarily by heat convection rather than by a negative pressure gradient provided by pump 514. For example, dryer 500 is thought to be capable of passing 750 CFM (cubic feet per minute) of air through drying chamber 504 by convection. In comparison, dryer 10 is thought to pump 450 CFM–500 CFM of air using pump 28. Thus, without expending energy to operate pump 514, dryer 500 is thought to provide greater airflow than horizontal dryers, e.g., dryer 10. In addition, the airflow can be further augmented by pump 514 or, alternatively, pump 514 can be eliminated to save costs.

Ambient air enters drying chamber 504 through space 526, and passes through heat exchanger 506, which heats the ambient air. The heated air passes through drying chamber 504 and exits through solar chimney 510. When the heated air passes through drying chamber 504, the air circulates around the coffee beans. Baffles 548 additionally allow air to flow between drying trays 502.

Referring to FIG. 12, dryers similar to dryer 500 can include two or more vertically stacked rows of drying trays 502. Such configurations allow vertical dryers similar to dryer 500 to rotate coffee beans during the drying process.

Dry coffee beans are removed from the lowest row of drying trays 502. Partially dry coffee beans are moved from upper rows to vacated lower rows. Finally, wet coffee beans are loaded into the vacated uppermost row of drying trays 502.

For example, as shown in FIG. 12, during the drying process, the coffee beans can be moved from an upper row 580 of drying trays 502 to a lower row 582 of drying trays 502. Row 580 and row 582 have identical structure, and are stacked to allow the coffee beans to move between pairs of vertically aligned drying trays 502. Because each drying tray 502 rotates away from a corresponding slat 550 to empty the coffee beans, the vertical alignment includes a horizontal offset between the upper row 580 and the lower row 582. The horizontal offset positions the lower drying tray 502 directly below corresponding opening 552.

The horizontal offset is established at the ends of each row 580, 582 of drying trays by specially sized slats 550', 550". For example, the left end of row 580 includes a slat 550' having a smaller width than the width of slats 550. Further, the right end of row 580 includes a slat 550" having a larger width than the width of slats 550. Row 582 is identical in structure to row 580, but, to provide the proper horizontal offset, row 582 is rotated 180° relative to row 580. Therefore, in row 582, thin slat 550' is located at the right end, and thick slat 550" is located at the left end.

The dimensions and materials disclosed in the embodiments above are provided as examples of possible embodiments. Changing the dimensions, materials, or components (adding, deleting or altering) will result in additional embodiments that are also within the scope of the claimed invention. For example, to augment the vegetable product drying, a dehumidifier, which removes moisture by using a desicant material, may be placed upstream of the coffee beans. for example, a dehumidifier can be installed upstream of the air pumps to remove moisture from either the ambient or heated air and, thus, increase the moisture gradient in the drying chamber. Also, air may be recirculated through the drying chamber after passing through a dehumidifier to reduce the relative humidity of the air while conserving heat energy of the air.

Dryer 10 is configurable to include many combinations of control devices 120 (FIG. 1) to control and monitor system performance. For example, dryer 10 can include temperature sensors to determine the temperature of ambient air, heated air, water in tank 102, or at other locations in dryer 10. Dryer 10 can also include humidity sensors to measure, e.g., the humidity of ambient air, air in chamber 24, and air exiting chamber 24. Dryer 10 can include a weight sensing device or a timing device to determine whether the coffee beans are properly dried.

Dryer 10 can also include a control system that monitors and controls the system and that evaluates the performance of dryer 10. The control system could include a personal computer to gather temperature, relative humidity, drying air flow rate, moisture loss of the beans (i.e., weight), and battery voltage and current.

For example, the control system could gather data in real time from 17 sensors connected to a DC power source: nine temperature sensors, three load cell sensors, one relative humidity sensor, one air velocity sensor, one battery voltage sensor, one photovoltaic collector current sensor, and one load current sensor. The control system could multiplex the 17 analog lines, and convert the analog data to digital data using National Instrument SCXI components having four-slot 1000 series chassis.

Hand held instrumentation can also be used to measure additional parameters, such as: water flow rate to collectors and heat exchangers, temperature of the water in the storage tank, temperature and flow rate of water at the inlet and outlet of the thermal solar collectors, and temperature and flow rate of water at the inlet and outlet of the water-to-air heat exchanger.

It is evident that those skilled in the art may now make numerous modifications and uses of and departures from the specific apparatus and techniques disclosed herein without departing from the inventive concepts. Consequently, the invention is to be construed as embracing each and every novel feature and novel combination of features present in or possessed by the apparatus and techniques disclosed herein and limited only by the spirit and scope of the appended claims.

What is claimed is:

1. A dryer for drying vegetable product comprising:
 a thermal collector constructed and arranged to convert solar energy to heat energy;
 a heat transfer system;
 a housing having a drying chamber;
 wherein said heat transfer system is in thermal communication with both said thermal collector and said drying chamber such that heat is able to move from said thermal collector to said drying chamber; and
 further comprising a photovoltaic module constructed and arranged to provide electrical power to said heat transfer system, said photovoltaic module being electrically connected to said heat transfer system.

2. The dryer of claim 1 wherein said photovoltaic module further comprises a battery constructed and arranged to store electrical energy.

3. The dryer of claim 2 wherein said photovoltaic module provides all of the electrical energy consumed by said dryer.

4. A dryer for drying vegetable product comprising:
 a thermal collector constructed and arranged to convert solar energy to heat energy;
 a heat transfer system;
 a housing having a drying chamber; and
 wherein said heat transfer system is in thermal communication with both said thermal collector and said drying chamber such that heat is able to move from said thermal collector to said drying chamber;
 wherein said heat transfer system further comprises:
 a first heat transfer circuit including a first pump and a first heat transfer medium;
 a second heat transfer circuit including a second pump and a second heat transfer medium;
 a first heat exchanger; and
 wherein said first heat exchanger is in thermal communication with said thermal collector via said first heat transfer circuit and said first heat exchanger is in thermal communication with said drying chamber via said second heat transfer circuit such that heat is able to move from said first heat transfer circuit to said second heat transfer circuit.

5. The dryer of claim 4 wherein said heat transfer system further comprises a second heat exchanger.

6. The dryer of claim 4 wherein said heat transfer system further comprises a heat storage medium, said heat storage medium being in thermal communication with said drying chamber such that heat is able to move from said heat storage medium to said second heat transfer circuit.

7. The dryer of claim 4 wherein said heat transfer system further comprises an auxiliary heat source, said auxiliary heat source being in thermal communication with said drying chamber such that heat is able to move from said auxiliary heat source to said second heat transfer circuit.

8. The dryer of claim 7 wherein the auxiliary heat source is a furnace constructed and arranged to burn biomass.

9. The dryer of claim 8 wherein said biomass is coffee parchment.

10. The dryer of claim 4 wherein said first heat transfer medium is water.

11. The dryer of claim 4 wherein said second heat transfer medium is air.

12. The dryer of claim 4 further comprising a heat storage medium in thermal communication with an auxiliary heat source, said thermal collector, and said drying chamber, wherein heat is able to move from said auxiliary heat source to said heat storage medium, from said thermal collector to said heat storage medium, and from said heat storage medium to said drying chamber.

13. A dryer for drying vegetable product comprising:
 a housing defining a cylindrical drying chamber, the housing having an outer wall extending around the drying chamber, the outer wall defining a plurality of perforations for intaking and exhausting fluid;
 an infuser adjacent to the perforations for infusing fluid through the perforations;
 wherein the housing is constructed and arranged to rotate relative to the infuser; and wherein the infuser is periodically adjacent to first and second relative sides of the outer wall, the first and second sides capable of changing position as the housing rotates relative to the infuser, the first relative side being in a position for intaking fluid into the drying chamber when the second relative side is in position for exhausting fluid from the drying chamber.

14. The dryer of claim 13 wherein the infuser is in thermal communication with a heat source for heating fluid to be infused into the drying chamber.

15. A housing defining a drying chamber for drying vegetable product, the housing comprising:
 a cylindrical wall extending around the drying chamber, opposing end walls at either end of the drying chamber, a plurality of perforations located for intaking and exhausting fluid, wherein the housing is constructed and arranged to rotate about an axis; and a set of doors in the cylindrical wall to load and unload vegetable product.

16. The housing of claim 15 further comprising a set of baffles for mixing produce within the drying chamber, the baffles extending from the inner surface of the cylindrical wall.

17. A dryer for drying vegetable product, comprising:
 a housing having a drying chamber, the housing having a fluid intake port and a fluid exhaust port located along a fluid flow path of the drying chamber, the intake and exhaust ports oriented such that the fluid flow path includes a substantial component in the vertical direction;
 a set of support members providing channels substantially oriented in the direction of the fluid flow path; and wherein the channels are adjustable relative to the vertical direction.

18. The dryer of claim 17 wherein the housing further comprises an entry port and an exit port, the entry port located vertically upward relative to the exit port.

19. The dryer of claim 17 wherein the channels are constructed and arranged to conduct product from a higher level relative to a ground level to a lower level relative to the ground level.

* * * * *